March 2, 1926.

S. J. NORDSTROM

VALVE

Filed March 19, 1923

1,575,125

2 Sheets-Sheet 2

Inventor
Sven Johan Nordstrom
By his Attorney
Archibald Cox

Patented Mar. 2, 1926.

1,575,125

UNITED STATES PATENT OFFICE.

SVEN JOHAN NORDSTROM, OF SAN FRANCISCO, CALIFORNIA, ASSIGNOR, BY DIRECT AND MESNE ASSIGNMENTS, TO MERCO NORDSTROM VALVE COMPANY, OF SAN FRANCISCO, CALIFORNIA, A CORPORATION OF DELAWARE.

VALVE.

Application filed March 19, 1923. Serial No. 626,001.

*To all whom it may concern:*

Be it known that I, SVEN JOHAN NORDSTROM, a subject of the King of Sweden, and a resident of San Francisco, in the county of San Francisco and State of California, have invented certain new and useful Improvements in Valves, of which the following is a specification.

The invention relates to an improvement in valves and more particularly to an improvement in plug valves.

The object of the invention is to produce a plug valve provided with improved means for preventing the valve from leaking and improved means for resiliently and adjustably holding the plug against its seat. To this end the invention consists in the improved plug valve hereinafter described and particularly pointed out in the appended claims.

Figure 1:
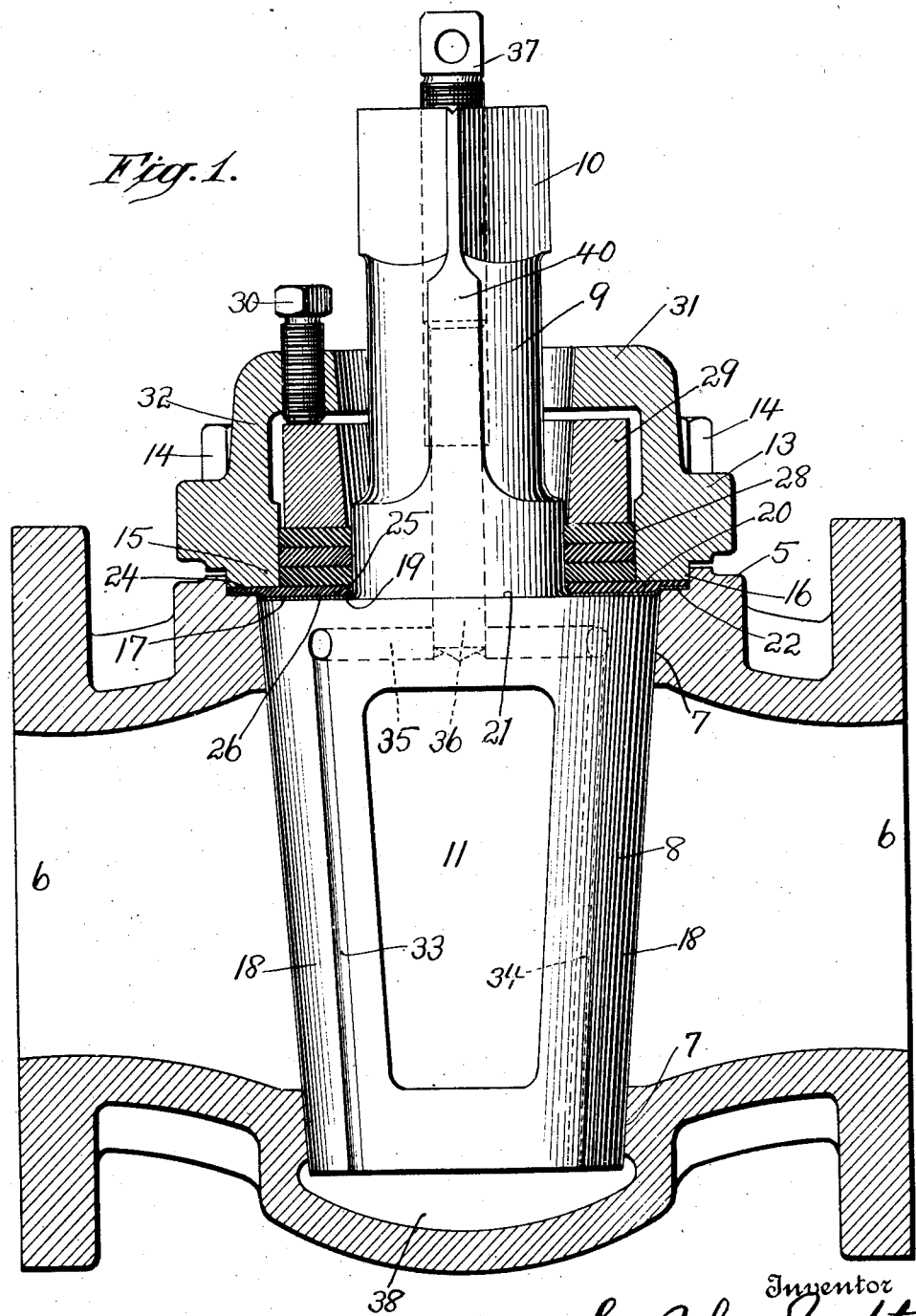
Figure 2:
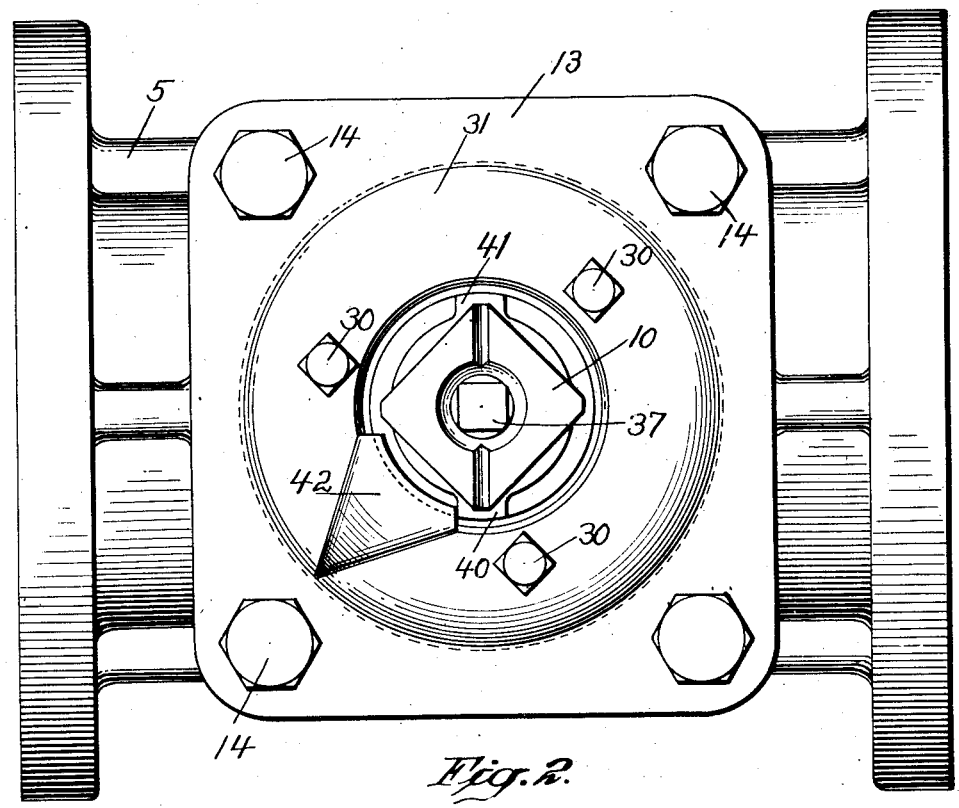
Figure 3:
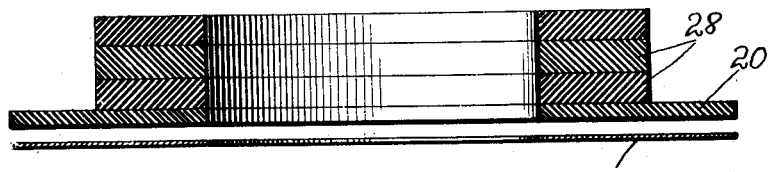

In the accompanying drawings illustrating the preferred form of the invention, Fig. 1 is a vertical, longitudinal section through the improved plug valve; Fig. 2 is a plan of the parts shown in Fig. 1; and Fig. 3 is a section, on an enlarged scale, through the resilient washers and the metal washer for holding the plug in place and for preventing leakage.

The improved plug valve, as illustrated in the drawings, comprises a casing 5 having a longitudinal passageway 6 therethrough. The casing 5 is provided with a valve seat 7 in which is seated a tapered plug 8 having a valve stem 9 of which the outer end 10 is squared to receive a wrench by which the plug may be turned to open and close the valve. The hole 11 in the plug 8 is adapted to register with the passageway 6 when the valve is open. When the plug has been turned through an angle of 90° from its open position, the hole 11 in the plug is at right angles to the passageway 6 through the valve casing and the valve is shut. The construction and mode of operation of these parts are well known.

The plug is held in place by means of a valve cover 13 secured to the casing 5 by the cap-screws 14. The valve cover 13 is provided on its underside with an annular flange 15 which seats within an annular recess 16 formed in the upper part of the casing 5 and surrounding the upper end of the tapered hole or valve seat 7.

When the valve is closed and the sides 18 of the plug lie across the passageway 6 through the casing, the pressure of the fluid in the pipe line in which the valve is interposed tends to cause leakage at the joint between the tapered valve seat 7 and the side of the plug 8 which is subjected to the pressure in the line. One feature of the present invention is the provision of means for preventing this leakage. The means employed for this purpose consists of a thin, anti-friction metal washer 17 which overlaps the joint between the upper end of the tapered portion of the plug and the adjacent portion of the casing. The thin metal washer 17 seats loosely within the annular recess 16 and extends inwardly to approximately the base of the valve stem 9. The inner edge 19 of the metal washer 17 is curved slightly in conformity with the fillet at the junction of the stem 9 and the upper end of the tapered portion of the plug. Superposed upon or overlying the anti-friction metal washer 17 is a resilient washer 20 of substantially the same diametrical dimensions as the washer 17.

When the valve parts are assembled, the plug 8 is ground into its seat until the upper end 21 of the tapered portion of the plug lies slightly below the bottom surface 22 of the annular recess 16. The thin metal washer 17 is then put in place and the resilient washer 20 is superposed upon the metal washer. The valve cover 13 is then placed in position and the cap-screws 14 are screwed into place so as to press the outer edge or rim 24 of the washer 20 tightly against the outer edge or rim of the metal washer 17, as shown in Fig. 1. The cap-screws 14 are tightened until the joint between the outer edge or rim of the washer 17 and the annular recess 16 is absolutely tight and non-leakable.

The plug is held resiliently and adjustably against its seat. For this purpose a series of resilient packing rings or washers 28 is superposed upon the inner portion or edge 25 of the resilient washer 20 and located between the base of the valve stem and the adjacent part of the valve cover 13. Resting on the pile of packing rings 28 is a follower ring 29, preferably of metal. The follower ring 29 is forced against the packing rings 28 to hold the plug resiliently against its seat with an adjustable pressure by means of a series of set-screws 30, the inner ends of which take against the follower ring 29. The set-screws 30 are threaded into top 31 of the valve cover part 32, which is in shape like an inverted pan. The construction is such that the cover incloses the packing rings 28 and the follower ring 29. The resilient packing rings 28 may be compressed to any desired degree to hold the plug against its seat with any desired degree of pressure. The compression of the resilient packing rings 28 forces the inner portion 26 of the thin metal washer 17 tightly against the upper end of the tapered portion of the plug. The joint between the inner portion 26 of the metal washer 17 and the upper end of the tapered portion of the plug is thereby made absolutely non-leakable. Before the parts are assembled a small quantity of lubricant is interposed between the metal washer and the upper end of the plug.

By holding the plug against its seat resiliently the plug may be lifted, whether the valve is open or shut, for various purposes, particularly for the purpose of lubricating the seating surface of the valve, that is to say, the surface of the plug and the surface of the valve seat in the casing. In the present embodiment, the lubrication is effected by means of two lubricating grooves 33 and 34 formed longitudinally in the tapered surface of the plug. The upper ends of the grooves communicate with a hole 35 formed transversely through the top of the plug. The transverse hole 35 is in communication with the lower end of a lubricant reservoir 36 bored longitudinally in the valve stem 9. The lubricant is forced out of the reservoir 36, through the hole 35 and down the grooves 33 and 34 by means of a screw 37 received in the end of the valve stem. To lift the plug from its seat so that the lubricant may be smeared over the seating surfaces of the valve, the lower ends of the grooves 33 and 34 and communicate with a chamber 38 formed in the valve casing beneath the lower end of the plug. By turning the screw 37 whether the plug is in open or closed position the lubricant in the chamber 38 is put under sufficient pressure to lift the plug slightly from its seat. When the plug is thus raised the lubricant oozes out along the grooves 33 and 34, so that when the plug is turned this excess of lubricant is smeared over the seating surface of the plug and valve seat and the valve is thereby effectively lubricated.

The plug is prevented from turning through an angle greater than 90° so as not to expose the lubricant grooves 33 and 34 to the fluid in the passageway 26. For this purpose the valve stem 9 is provided with the projections or fins 40 and 41 which are adapted to contact with the stop 42 rising from the part 31 of the valve cover.

Having thus described the invention what I claim as new is:—

1. A valve comprising a casing having a passageway therethrough and a tapered valve seat therein, a plug seated in the valve seat and having a hole adapted to register with the passageway, the casing being provided with an annular recess surrounding the upper end of the tapered valve seat, a metal washer seated in the recess and extending to the valve stem, a resilient washer superposed upon the metallic washer, a valve cover for fixedly holding the outer edges or rims of the washers against the casing and means for adjustably holding the inner portions of the washers against the top of the tapered portion of the plug.

2. A valve comprising a casing having a passageway therethrough and a tapered valve seat therein, a plug seated in the valve seat and having a hole adapted to register with the passageway, the casing being provided with an annular recess surrounding the upper end of the tapered valve seat, a metal washer seated in the recess and extending inwardly to the valve stem, a resilient washer superposed upon the metal washer, a valve cover for fixedly holding the outer edges or rims of the washers against the casing, a series of packing rings superposed upon the inner edges of the washers and means for adjustably compressing the packing rings and thereby holding the inner portion of the metal washer with adjustable pressure against the upper end of the tapered portion of the plug.

3. A valve comprising a casing having a passageway therethrough and a tapered valve seat therein, a plug seated in the valve seat and having a hole adapted to register with the passageway, the casing being provided with an annular recess surrounding the upper end of the tapered valve seat, a valve cover for holding the plug in place, a washer resting on the upper end of the tapered portion of the plug and having its rim held between the cover and the adjacent portion of the casing, a series of resilient packing rings superposed upon the inner edge of the washer and located between the valve stem and the adjacent part of the cover, a follower ring resting on the packing rings and a series of set-screws supported from a portion of the cover rising above the follower ring adapted to force the follower ring with adjustable pressure against the packing rings.

4. A valve comprising a casing having a passageway therethrough and a tapered valve seat therein, a plug seated in the valve seat and having a hole adapted to register with the passageway, the casing being provided with a recess surrounding the upper end of the tapered valve seat, a metal washer seated in the recess and extending inwardly to the valve stem, a resilient washer superposed upon the metal washer, a valve cover in the form of an inverted pan for holding the outer edges of the washers against the casing, a follower ring, a series of resilient rings resting on the inner edges of the washers and set-screws supported in the top of the cover for forcing the follower ring with adjustable pressure against the resilient rings and the washers to hold the plug resiliently and adjustably against its seat.

SVEN JOHAN NORDSTROM.